Oct. 31, 1967  J. C. BECKER, JR., ET AL  3,349,464
METHOD OF MAKING ROCKET COMBUSTION CHAMBER
Filed June 29, 1962  3 Sheets-Sheet 1
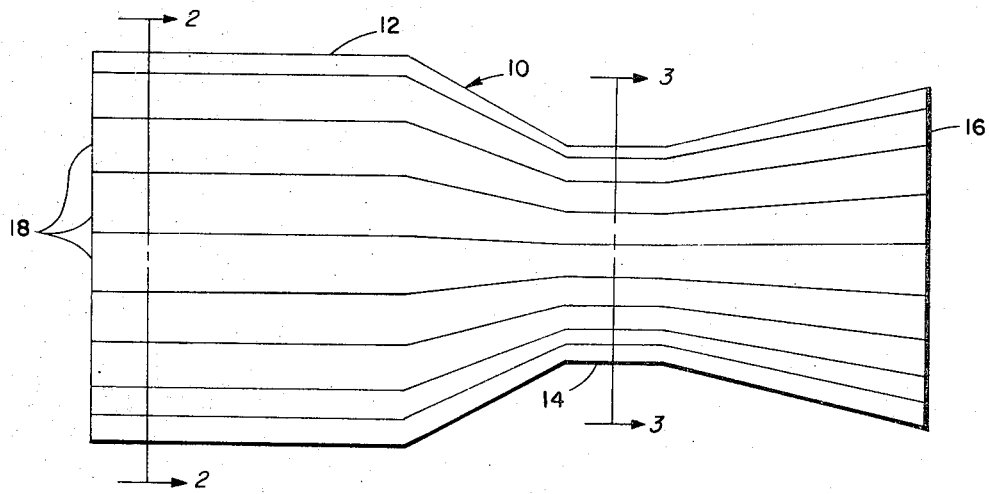
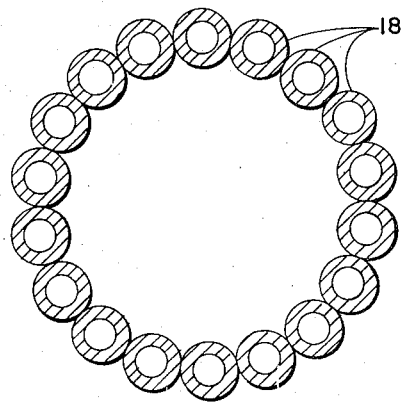
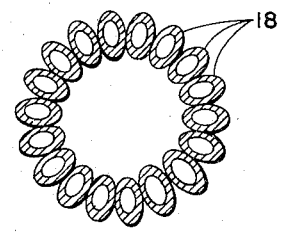
INVENTOR.
JOHN C. BECKER, JR.
HARVEY A. EUBANK, deceased
BY by JEANETTE S. EUBANK,
Administratrix
Edward O. Ansell
ATTORNEY

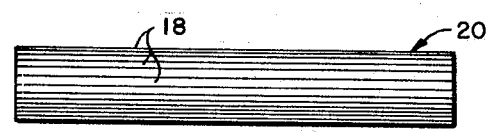
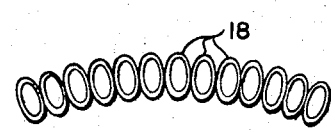
FIG.-4  FIG.-5
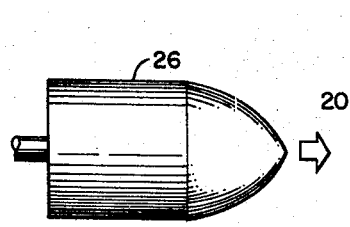
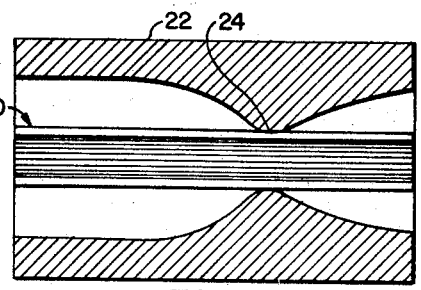
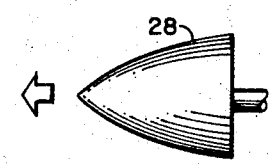
FIG.-6
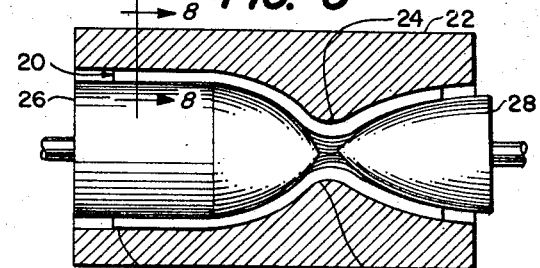
FIG.-7
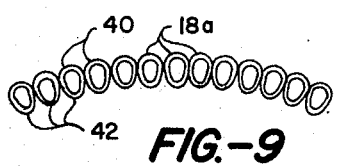
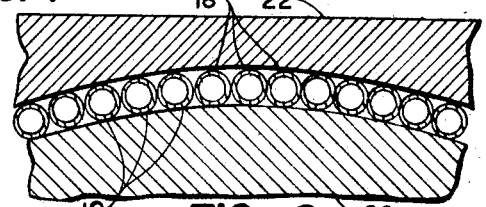
FIG.-9  FIG.-8
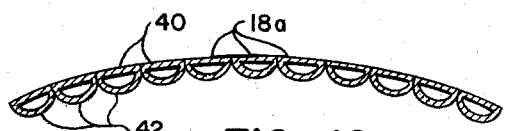
FIG.-10

Oct. 31, 1967   J. C. BECKER, JR., ET AL   3,349,464
METHOD OF MAKING ROCKET COMBUSTION CHAMBER

INVENTORS
JOHN C. BECKER, JR.
HARVEY A. EUBANK, DECEASED,
BY JEANETTE S. EUBANK, ADMINISTRATRIX
BY
ATTORNEY

United States Patent Office 3,349,464
Patented Oct. 31, 1967

3,349,464
METHOD OF MAKING ROCKET COMBUSTION
CHAMBER
John C. Becker, Jr., Pasadena, and Harvey A. Eubank, deceased, late of Sacramento, Calif., by Jeanette S. Eubank, administratrix, Sacramento, Calif.; assignors to Aerojet-General Corporation, Azusa, Calif., a corporation of Ohio
Filed June 29, 1962, Ser. No. 206,522
19 Claims. (Cl. 29—157)

This invention relates to the method of manufacturing a rocket combustion chamber and, in particular, to a rocket combustion chamber formed of a plurality of longitudinally extending tubes.

Heretofore rocket combustion chambers formed of a plurality of circumferentially arranged elongated hollow tubes have been very costly to manufacture. In this type of a combustion chamber it is necessary to shape each individual tube so that it will have a circular cross section in the main combustion section of the chamber and near the end of the nozzle, while those portions of the tubes which form the throat of the nozzle must be shaped so as to have greater width in a radial direction than in the circumferential direction. Also, each of the individual tubes must be bent in a longitudinal direction so that when the tubes are assembled they will form a narrow throat for the combustion chamber. It has been the practice to form these tubes by placing each one of them individually in a die and applying pressure to shape them. It can be readily appreciated that this would be a very time consuming and expensive operation when a large number of such tubes are required to form a combustion chamber.

It is therefore the principal object of the present invention to provide a method of forming a rocket combustion chamber which is both inexpensive and extremely simplified.

It is an additional object of the invention to manufacture a rocket combustion chamber by shaping each of the elongated hollow tubes thereof to the proper configuration essentially simultaneously.

In its principal aspect, the present invention comprises forming a generally cylindrical hollow member of a plurality of longitudinally extending hollow tubes and then placing the hollow member in an external die having the desired configuration of a rocket combustion chamber. Each individual tube, instead of having a circular cross-section, is originally shaped so as to have either an elliptical cross-section or any other desirable cross-section in which its width in the radial direction is greater than that in the circumferential direction when the tubes are assembled as a cylinder. Pressure is then applied either to the internal portion of the cylindrical hollow member or to the interior of each individual tube, thereby forcing outwardly portions of the hollow member against the external die to form the combustion chamber. It can be appreciated that those portions of the tubes which are forced outwardly against the die are caused to be compressed, and generally each of such tubes obtains a circular cross-section in those portions. However, the portions of the longitudinally extending tubes in the narrow part of the die which are not forced outwardly are not compressed. Therefore, these portions maintain their original elliptical cross-section shape which is the desired shape for providing the maximum amount of cooling in the throat of the combustion chamber when a coolant is passed through the tubes thereof.

Other objects, aspects, and advantages will become apparent from the following description in connection with the accompanying drawings wherein:

FIGURE 1 is a side view of a completed rocket combustion chamber made in accordance with this invention;

FIGURE 2 is a cross-sectional view taken on line 2—2 in FIGURE 1;

FIGURE 3 is a cross-sectional view taken on line 3—3 in FIGURE 1;

FIGURE 4 is a side view of a cylindrical hollow member formed of a plurality of hollow tubes;

FIGURE 5 is an enlarged partial end view of FIGURE 4;

FIGURE 6 is a partial longitudinal sectional view of a die and mandrel arrangement which is used in one embodiment of the method of this invention;

FIGURE 7 is a partial longitudinal sectional similar to FIGURE 6 but showing the mandrels in forming position;

FIGURE 8 is an enlarged partial sectional view taken one line 8—8 of FIGURE 7;

FIGURE 9 is an enlarged partial end view of a different embodiment of the tubes shown in FIGURE 4;

FIGURE 10 is an enlarged partial sectional view similar to FIGURE 8 showing the configuration of the tubes in FIGURE 9 after they have been expanded;

Figure 11:
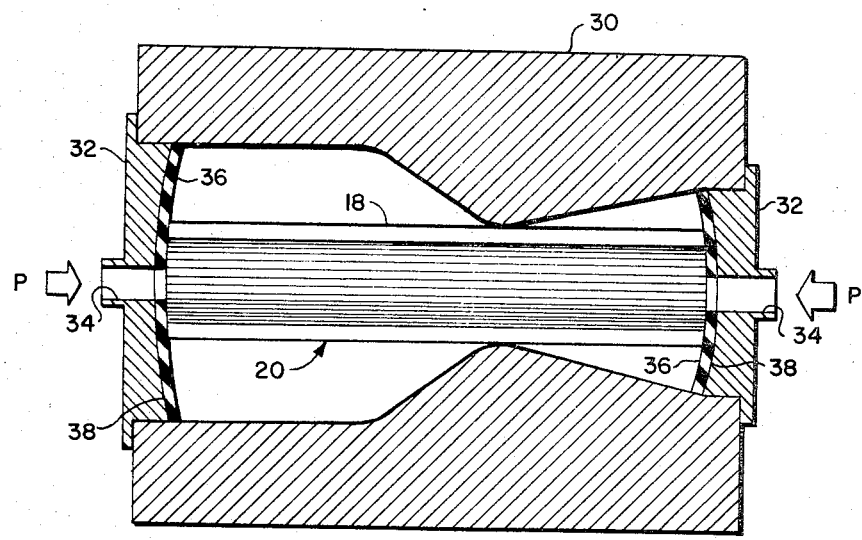
FIGURE 11 is a longitudinal sectional view of an additional embodiment of the invention showing a die in which fluid pressure or an explosive charge is used.

Referring now to FIGURE 1 of the drawings a rocket combustion chamber 10 is shown which is formed by the method of this invention. This combustion chamber has a combustion section 12, a throat section 14 and a nozzle section 16. The entire chamber is formed of a plurality of longitudinally extending hollow tubes 18. The portions of the tubes in the combustion section 12 and at the end of the nozzle 16 have a generally circular cross-section as seen in FIGURE 2. The portions of the tubes in the throat section 14 of the chamber are shaped so as to have decreasing cross-sectional areas as seen in FIGURE 3 so that when fluid passes through the tubes the velocity of the fluid or a coolant increases thereby permitting a rapid removal of heat. This construction also provides a lightweight combustion chamber which has adequate strength to withstand high pressure and temperatures developed in the combustion chamber.

To construct the combustion chamber in accordance with this invention it is first necessary to form an elongated hollow cylindrical member, generally designated by numeral 20 in FIGURE 4, of a plurality of longitudinally extending tubes 18. The tubes, in the preferred embodiment of this invention, may be extruded or shaped by any other means so as to be elliptical in cross-section as seen in FIGURE 5. The tubes are placed in a parallel touching relationship and generally in the shape of a cylinder with the major axis of the elliptical cross-section tubes extending generally in a radial direction or, in other words, in a manner in which the width of the tubes in the radial direction is greater than that in the circumferential direction. The tubes are then connected by any suitable means such as welding along the point of contact of the sides of the tubes. Once the hollow member 20 is formed it is ready to be shaped into a combustion chamber. Although the hollow member 20 has been shown in FIGURES 4 and 5 as being generally of a circular cross-section, it is understood that it may also be of any other desired shape as, for example, a generally elliptical shape providing drainage in the bottom of the chamber.

In order to form a combustion section and a nozzle section for a combustion chamber some force must be applied to the elongated tubes 18 of the hollow member 20 to spread them outwardly. In the preferred embodiment of the invention, as shown in FIGURES 6, 7, and 8, the hollow member 20 is placed in an external die 22 which has the configuration of a rocket combustion chamber. It can be seen that the throat portion 24 of the die has the same diameter as the external diameter of the hollow member 20. Mandrels 26 and 28 are positioned on opposite ends of the die and may be forced in the direction of the arrows in FIGURE 6 into the die to force the assembly of hollow tubes 18 outwardly against the surface of the die as seen in FIGURE 7. In this manner all the tubes 18 are simultaneously shaped with the portion of the tubes in the throat section 14 maintaining their generally elliptical cross-section while the tubes in the combustion section and nozzle section of the combustion chamber obtain a circular cross-section as seen in FIGURE 8.

An additional method of shaping the hollow member 20 into a combustion chamber is shown in FIGURE 11. A die 30 similar to that shown in FIGURES 6 and 7 is provided and includes caps 32 at the ends thereof for closing the die. The hollow member 20 formed of a plurality of tubes 18 is placed in the die 30. Then the caps 32 are secured to the end of the die by any suitable means. The caps include ports 34 for the entrance of fluid under pressure. The internal walls 38 of the caps are covered with a resilient sealing material 36 such as rubber so that when the hollow member 20 is expanded against the walls of the die 30 the ends of the hollow member 20 will be in sealing relationship with the caps 32. It can be seen that the internal walls 38 of the caps 32 have a generally conical shape so as to compensate for the shortening of the tubes 18 when they are expanded against the walls of the die 30.

Fluid under pressure can then be inserted through the ports 34 in the direction of the arrows shown in FIGURE 11 to pressurize the internal portion of the hollow member 20. When a sufficient pressure is obtained the hollow member 20 will deform and be forced outwardly against the walls of the external die 30 thereby shaping the tubes in a fashion similar to the method shown in FIGURES 6 and 7. It can be appreciated that other means may be provided to expand the hollow member 20 rather than fluid pressure. It is contemplated that an explosive means, such as solid propellant grain or nitrocellulose compounds, may be placed in the hollow member 20 and then detonated to explosive-form the combustion chamber. This method would have an advantage over the fluid pressure method in that the problem of providing a tight sealing relationship between the ends of the tubes 18 and the cap 32 would not be so important because of the instantaneous application of the internal force in the hollow member 20.

In the methods hereinabove described the hollow member 20 may be formed of tubes 18 having an elliptical cross-section as shown in FIGURE 5. However, a differently shaped tube 18a, as seen in FIGURE 9, may be provided which when formed will result in a different final shape of the combustion chamber. The cross-section of the tubes 18a is essentially elliptical but the tubes are connected at a point above the midpoint along the sides thereof. This provides a short material section 40 outwardly of the connecting line of each tube and a longer material section 42 inwardly of said line so that when the hollow member 20 is forced outwardly either by a mandrel, fluid or explosive pressure, the tubes 18a instead of obtaining a circular cross-section will obtain a cross-section as shown in FIGURE 10. It can be seen that the external surface of the finished combustion chamber along the combustion section and at the end of the nozzle section will be virtually smooth because the short material sections 40 of the tubes are stretched so as to form essentially a continuous arcuate surface. Such a combustion chamber has an advantage over a combustion chamber comprising tubes 18 shaped to have circular cross-sections upon expansion of the hollow member 20 as shown in FIGURE 8 in that it is generally necessary that the external spaces between the portions of the tubes 18 in FIGURE 8 be filled with welding material or the like in order to provide a generally smooth outer surface for the combustion chamber.

Figure 12:
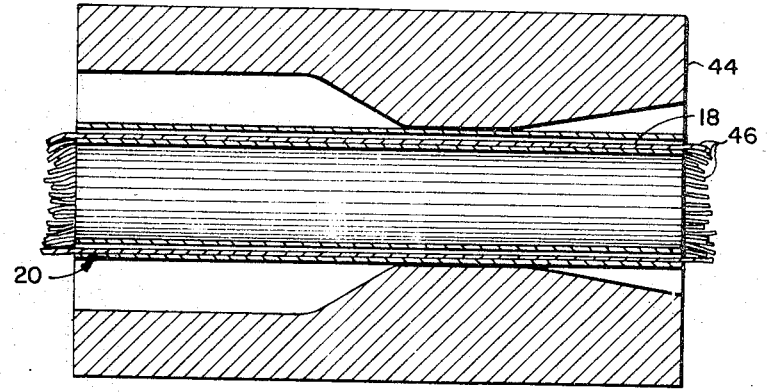
FIGURE 12 is a longitudinal sectional view showing still another embodiment of the invention wherein an explosive charge is provided in each individual elongated tube.
Figure 13:
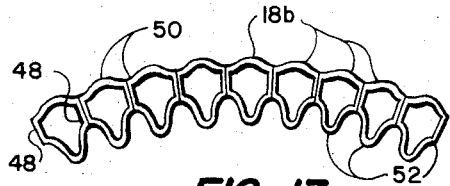
FIGURES 13 and 14 are enlarged partial end views similar to FIGURE 5 but showing additional configurations of elongated hollow tubes which may be used in the die in FIGURE 12.
Figure 14:
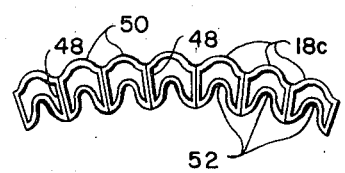

Still another embodiment of the method will be described in connection with FIGURE 12 which shows an external die 44 which has the shape of a rocket combustion chamber. As in the other methods a cylindrical hollow member 20 formed of a plurality of tubes 18 is placed in the die 44. However, instead of pressurizing the internal portion of the hollow member 20 to expand the tubes against the die 44, an explosive means is provided in each tube 18 to expand each tube individually. This means may be a primacord 46 as seen in FIGURE 12. However, solid propellant grains, nitrocellulose compounds, or any other explosive means may be used within each tube 18 which, when detonated, will individually expand tubes 18. The tubes may originally have an elliptical cross-sectional shape as shown in FIGURES 5 and 9 or instead may have a different shape such as shown in FIGURES 13 and 14 of the drawings. The tubes 18b and 18c shown in FIGURES 13 and 14, respectively, have an irregular shape and may be formed by extruding or any other suitable means. The external and internal circumferential portions 50 and 52, respectively, of tubes 18b and 18c have a generally crimped shape and the side walls 48 are flat and are connected to portions 50 and 52 such as by welding.

Figure 15:
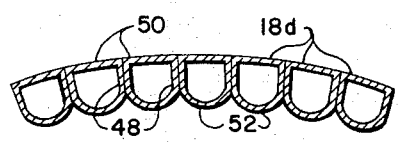
FIGURE 15 is an enlarged partial sectional view of a finished rocket combustion chamber showing the configuration of the tubes of either FIGURE 13 or FIGURE 14 after they have been expanded.

When it is desired to expand the hollow member 20 in the die 44 the primacords 46 in the tubes 18 are simultaneously detonated thereby expanding the walls of each of the individual tubes. It can be appreciated that since each tube is expanded the entire circumferential assembly of the tubes of the hollow member 20 will be expanded against the walls of the die 44 thereby forming the desired-shaped combustion chamber. This process is advantageously used with the tubes shown in FIGURES 13 and 14. Since the external portions 50 of the tubes 18b and 18c have less material length than the internal portions 52 thereof the expanded tubes as shown in FIGURE 15 will have an outer surface providing a generally smooth continuous arcuate surface for the entire combustion chamber in the areas of the combustion section and the nozzle section. As mentioned above, solid propellant grains or other explosive charges may be used in the tubes to individually expand the tubes instead of using a primacord 46. It is also appreciated that other means for pressurizing the tubes may be used such as fluid under pressure but this would have a limitation in the problem of sealing each tube with a hose which supplies fluid pressure thereto.

In each of the above-mentioned methods prior to the forming of the rocket combustion chamber by the expansion of the hollow member, each tube of the plurality of elongated hollow tubes comprising the hollow member may be characterized as having its width as measured along a first plane longitudinally bisecting the tube greater than that as measured along another plane longitudinally bisecting the tube and transverse to the first plane.

Although the above-mentioned methods are described in relation to the forming of a rocket combustion chamber it is appreciated that the methods could be used to form other end products. For example, the die 22 may have additional curves or protrusions to provide any number of shapes for a finished article. Also it is not necessary that the hollow member 20 be formed of tubular members having a cross-section as disclosed herein but instead any particular cross-sectional shaped tube may be used depending on the desired shape of the end product. Moreover, the tubes may be circular in cross-section before pressure is applied thereto to expand the tubes against the walls of the die, thereby providing an end product having tubes which are wider in the circumferential direction than in the radial direction.

It will, of course, be understood that various changes can be made in the form details, arrangement, and proportions of the various parts used in the method of this invention without departing from the spirit and scope of the invention as defined by the following claims.

We claim:

1. The method of fabricating a fluid-conducting structure comprising the steps of: connecting a plurality of discreate elongated straight hollow tubes in parallel side-by-side touching relationship and in encompassing relation to a common longitudinal axis so as to form an elongated hollow member having a composite circumferential wall whose individual portions respectively comprise an individual hollow tube, and forcing outwardly longitudinally extending portions of said hollow member on either side of an intermediate point thereon.

2. The method of fabricating a rocket combustion chamber having a combustion section, a throat section, and a nozzle section comprising the steps of: connecting a plurality of discrete elongated straight hollow tubes in parallel side-by-side touching relationship and in encompassing relation to a common longitudinal axis so as to form an elongated hollow member having a composite circumferential wall whose individual portions respectively comprise an individual hollow tube, and substantially simultaneously expanding each of said hollow tubes on either side of an intermediate point thereon whereby said elongated hollow member will be expanded on either side of an intermediate point thereon to form a combustion section and a nozzle section.

3. The method as set forth in claim 2, wherein each of said hollow tubes is expanded on either side of an intermediate point thereon by placing the elongated hollow member in an external die having an internal configuration conforming to the shape of a rocket combustion chamber with the smallest internal diameter portion of said die being equal to the outer diameter of said elongated hollow member, and admitting fluid under pressure into the elongated hollow member.

4. The method as set forth in claim 2, wherein each of said hollow tubes is expanded on either side of an intermediate point thereon by placing the elongated hollow member in an external die having an internal configuration conforming to the shape of a rocket combustion chamber with the smallest internal diameter portion of said die being equal to the outer diameter of said elongated hollow member, and detonating respective explosive charges located within each of the hollow tubes.

5. The method as set forth in claim 2, wherein each of said hollow tubes has its width as measured along a first plane longitudinally bisecting the tube greater than that as measured along another plane longitudinally bisecting the tube and transverse to the first plane and its greatest width extending in a generally radial direction with respect to the axis of said elongated hollow member before the substantially simultaneous expansion of each of said hollow tubes on either side of an intermediate point thereon.

6. The method of fabricating a rocket combustion chamber having a combustion section, a throat section, and a nozzle section comprising the steps of: connecting a plurality of discrete elongated straight hollow tubes in parallel side-by-side touching relationship and in equally spaced encircling relation to a common longitudinal axis so as to form an elongated cylindrical member with a diameter equal to that of said throat section and having a composite circumferential wall whose individual portions respectively comprise an individual hollow tube, and forcing outwardly longitudinally extending portions of said elongated cylindrical member on either side of an intermediate point thereon thereby forming a combustion section and a nozzle section.

7. The method as set forth in claim 6, wherein each of said hollow tubes of said elongated cylindrical member has a cross-section in which its width in the radial direction with respect to the longitudinal axis of the elongated cylindrical member is greater than that in the circumferential direction before the longitudinally extending portions of said elongated cylindrical member on either side of an intermediate point thereon are forced outwardly.

8. The method as set forth in claim 6, wherein each of said hollow tubes has a generally elliptical cross-section with the major axis thereof extending in a generally radial direction with respect to the longitudinal axis of the elongated cylindrical member before the longitudinally extending portions of said elongated cylindrical member on either side of an intermediate point thereon are forced outwardly.

9. The method of forming a chamber having a main portion and a portion converging to a minimum cross-sectional area smaller than that of said main portion comprising the steps of: forming a plurality of elongated hollow tubes each having its width as measured along a first plane longitudinally bisecting the tube greater than that as measured along another plane longitudinally bisecting the tube and transverse to the first plane, forming an elongated hollow member with said minimum cross-sectional area by circumferentially connecting in side-by-side relationship said plurality of elongated hollow tubes with the greatest width of each of said elongated hollow tubes extending in a generally radial direction with respect to the longitudinal axis of said elongated hollow member, and forcing outwardly a portion of said elongated hollow member thereby forming said main portion of the chamber.

10. The method of fabricating a rocket combustion chamber having a combustion section, a throat section, and a nozzle section comprising the steps of: forming a plurality of elongated hollow tubes each having its width as measured along a first plane longitudinally bisecting the tube greater than that as measured along another plane longitudinally bisecting the tube and transverse to the first plane, forming an elongated cylindrical member with a diameter equal to that of said throat section by circumferentially connecting in side-by-side relationship said plurality of elongated hollow tubes with the greatest width of each of said elongated hollow tubes disposed in a radial direction with respect to the longitudinal axis of said elongated cylindrical member, and forcing outwardly longitudinally extending portions of the internal surface of said elongated cylindrical member on either side of an intermediate point thereon thereby forming the combustion section and the nozzle section.

11. The method as set forth in claim 10, wherein forcing longitudinally extending portions of the internal surface of said elongated cylindrical member outwardly is accomplished by forcing mandrels having a configuration of a combustion section and a nozzle section into opposite ends of said elongated cylindrical member.

12. The method of fabricating a rocket combustion chamber having a combustion section, a throat section, and a nozzle section comprising the steps of: forming a plurality of elongated hollow tubes each having its width as measured along a first plane longitudinally bisecting the tube greater than that as measured along another plane longitudinally bisecting the tube and transverse to the first plane, placing said elongated hollow tubes in parallel touching relationship and generally in the shape of a cylinder with the greatest width of each of said elongated hollow tubes extending in a generally radial direction with respect to the axis of said cylinder, connecting adjacent walls of each of said parallel touching elongated hollow tubes to thereby form the cylinder, and forcing outwardly longitudinally extending portions of said cylinder on either side of an intermediate point thereon until the width of each of said elongated hollow tubes in the outwardly forced longitudinally extending portions of said cylinder is at least as great in the circumferential direction as the width thereof in the radial direction.

13. The method of fabricating a rocket combustion chamber having a combustion section, a throat section, and a nozzle section comprising the steps of: forming a plurality of elongated hollow tubes each having a generally elliptical cross-section, placing said elongated hollow tubes in parallel touching relationship and generally in the shape of a cylinder with the major axis of each of said elongated hollow tubes extending in a generally radial direction with respect to the axis of said cylinder, connecting adjacent walls of each of said parallel touching elongated hollow tubes to thereby form the cylinder, and forcing outwardly longitudinally extending portions of said cylinder on either side of an intermediate point thereon until the elongated hollow tubes have a generally circular cross-section in the outwardly forced longitudinally extending portions of said cylinder.

14. The method of fabricating a rocket combustion chamber having a combustion section, a throat section, and a nozzle section comprising the steps of: forming a plurality of elongated hollow tubes each having its width as measured along a first plane longitudinally bisecting the tube greater than that as measured along another plane longitudinally bisecting the tube and transverse to the first plane, placing said elongated hollow tubes in parallel touching relationship and generally in the shape of a cylinder with the greatest width of each of said elongated hollow tubes extending in a generally radial direction with respect to the axis of said cylinder, connecting adjacent walls of each of said parallel touching elongated hollow tubes to thereby form the cylinder, placing said cylinder in an external die having an internal configuration conforming to the shape of a rocket combustion chamber with the smallest internal diameter portion of said die being equal to the outer diameter of said cylinder, and applying pressure to the internal surface of said cylinder thereby expanding portions of said cylinder against said die to form a combustion section and a nozzle section.

15. The method as set forth in claim 14 wherein pressure is applied to the internal surface of said cylinder by admitting pressure fluid into the cylinder.

16. The method of fabricating a rocket combustion chamber having a combustion section, a throat section, and a nozzle section comprising the steps of: forming a plurality of elongated hollow tubes each having its width as measured along a first plane longitudinally bisecting the tube greater than that as measured along another plane longitudinally bisecting the tube and transverse to the first plane, placing said elongated hollow tubes in parallel touching relationship and generally in the shape of a cylinder with the greatest width of each of said elongated hollow tubes extending in a generally radial direction with respect to the axis of said cylinder, connecting adjacent walls of each of said parallel touching elongated hollow tubes to thereby form the cylinder, placing said cylinder in an external die having an internal configuration conforming to the shape of a rocket combustion chamber with the smallest internal diameter portion of said die being equal to the outer diameter of said cylinder, placing an explosive charge within said cylinder, and detonating said explosive charge to force outwardly the internal surface of said cylinder against said die to form a combustion section and a nozzle section.

17. The method of fabricating a rocket combustion chamber having a combustion section, a throat section, and a nozzle section comprising the steps of: forming a plurality of elongated hollow tubes each having its width as measured along a first plane longitudinally bisecting the tube greater than that as measured along another plane longitudinally bisecting the tube and transverse to the first plane, placing said elongated hollow tubes in parallel touching relationship and generally in the shape of a cylinder with the greatest width of each of said elongated hollow tubes extending in a generally radial direction with respect to the axis of said cylinder, connecting adjacent walls of each of said parallel touching elongated hollow tubes to thereby form the cylinder, placing said cylinder in an external die having an internal configuration conforming to the shape of a rocket combustion chamber with the smallest internal diameter portion of said die being equal to the outer diameter of said cylinder, and simultaneously applying pressure to the interior of each of said elongated hollow tubes to expand said tubes and consequently said cylinder against said die.

18. The method of fabricating a rocket combustion chamber having a combustion section, a throat section, and a nozzle section comprising the steps of: forming a plurality of elongated hollow tubes each having a generally elliptical cross-section, placing said elongated hollow tubes in parallel touching relationship and generally in the shape of a cylinder with the major axis of each of said elongated hollow tubes extending in a generally radial direction with respect to the axis of said cylinder, connecting adjacent walls of each of said parallel touching elongated hollow tubes to thereby form the cylinder, placing said cylinder in an external die having an internal configuration conforming to the shape of a rocket combustion chamber with the smallest internal diameter portion of said die being equal to the outer diameter of said cylinder, and applying pressure to the internal surface of said cylinder thereby expanding portions of said cylinder against said die to form a combustion section and a nozzle section.

19. The method of fabricating a rocket combustion chamber having a combustion section, a throat section, and a nozzle section comprising the steps of: forming a plurality of elongated hollow tubes each having its width as measured along a first plane longitudinally bisecting the tube greater than that as measured along another plane longitudinally bisecting the tube and transverse to the first plane, placing said elongated hollow tubes in parallel touching relationship and generally in the shape of a cylinder with the greatest width of each of said elongated hollow tubes extending in a generally radial direction with respect to the axis of said cylinder, connecting adjacent walls of each of said parallel touching elongated hollow tubes at points above the longitudinal axis thereof to thereby form the cylinder, anf forcing outwardly longitudinally extending portions of said cylinder on either side of an intermediate point thereon until the outer portions of said elongated hollow tubes between said points where adjacent tubes are connected define a substantially continuous arcuate surface in the outwardly forced longitudinally extending portions of said cylinder, thereby providing a generally smooth outer surface on said outwardly forced longitudinally extending portions of said cylinder.

References Cited

UNITED STATES PATENTS

| | | | |
|---|---|---|---|
| 2,956,334 | 10/1960 | Steward | 29—175 |
| 2,958,183 | 11/1960 | Singelmann | 60—35.6 |
| 3,044,430 | 7/1962 | Zeigler | 29—421 X |
| 3,069,850 | 12/1962 | Ledwith | 60—35.6 |
| 3,208,132 | 9/1965 | Escher | 29—157 |
| 3,235,947 | 2/1966 | Sohlemann | 29—157 |

JOHN F. CAMPBELL, *Primary Examiner.*

WHITMORE A. WILTZ, *Examiner.*

J. D. HOBART, *Assistant Examiner.*